United States Patent [19]
Butler et al.

[11] 3,724,684
[45] Apr. 3, 1973

[54] BALE RELOCATOR MECHANISM FOR A BALE WAGON

[75] Inventors: Gene R. Butler; Gary L. Sipe, both of Kingsburg, Calif.

[73] Assignee: Sperry Rand Corporation, New Holland, Pa.

[22] Filed: Dec. 22, 1971

[21] Appl. No.: 210,731

[52] U.S. Cl. .................... 214/6 B, 100/7, 198/7 BL, 214/518, 214/520
[51] Int. Cl. ............................................. B65g 57/32
[58] Field of Search ....... 214/6 B, 6 P, 518, 519, 520; 198/223, 7 BL; 100/7

[56] References Cited

UNITED STATES PATENTS 3,664,519   5/1972   Grey ..................................... 214/6 B Primary Examiner—Robert J. Spar
Attorney—John C. Thompson, Joseph A. Brown and James J. Kennedy

[57] ABSTRACT

A bale relocator mechanism for engaging and repositioning selected bales on a bale wagon. The bale relocator mechanism of the present invention is disclosed in the form of two species, each species being adapted for employment within a bale wagon having a first receiving table adapted to receive bales and transfer the bales received to a rearwardly disposed transfer table where the bales are accumulated into a tier, at which point the transfer table functions to transfer each tier to a rearwardly disposed load bed to form a stack of side-by-side tiers thereon.

The first species comprises a hydraulically powered finger structure pivotally mounted about a longitudinally extending axis beneath the transfer table of the bale wagon and operative to move through an opening therein for engaging and laterally repositioning an overlying bale. A fence structure is situated along one side of said transfer table in spaced apart relationship to said finger structure to limit the lateral movement of the bale being repositioned.

The second species comprises a mechanically actuated finger structure that is associated with the receiving table of the bale wagon. The finger structure of the second species is carried by a laterally extending connecting rod, the fingers of the finger structure being pivotally mounted thereon and aligned for engagement with a series of cams. The connecting rod is moved laterally, causing said fingers to contact said cams and move upwardly engaging and repositioning a bale thereover, by a bell crank engaging a trap door as said receiving table is pivoted upwardly to deposit bales thereon on said transfer table. As with the first species, a fence structure is provided along one side of said transfer table to maintain the outer ends of the bales repositioned within limits.

20 Claims, 8 Drawing Figures

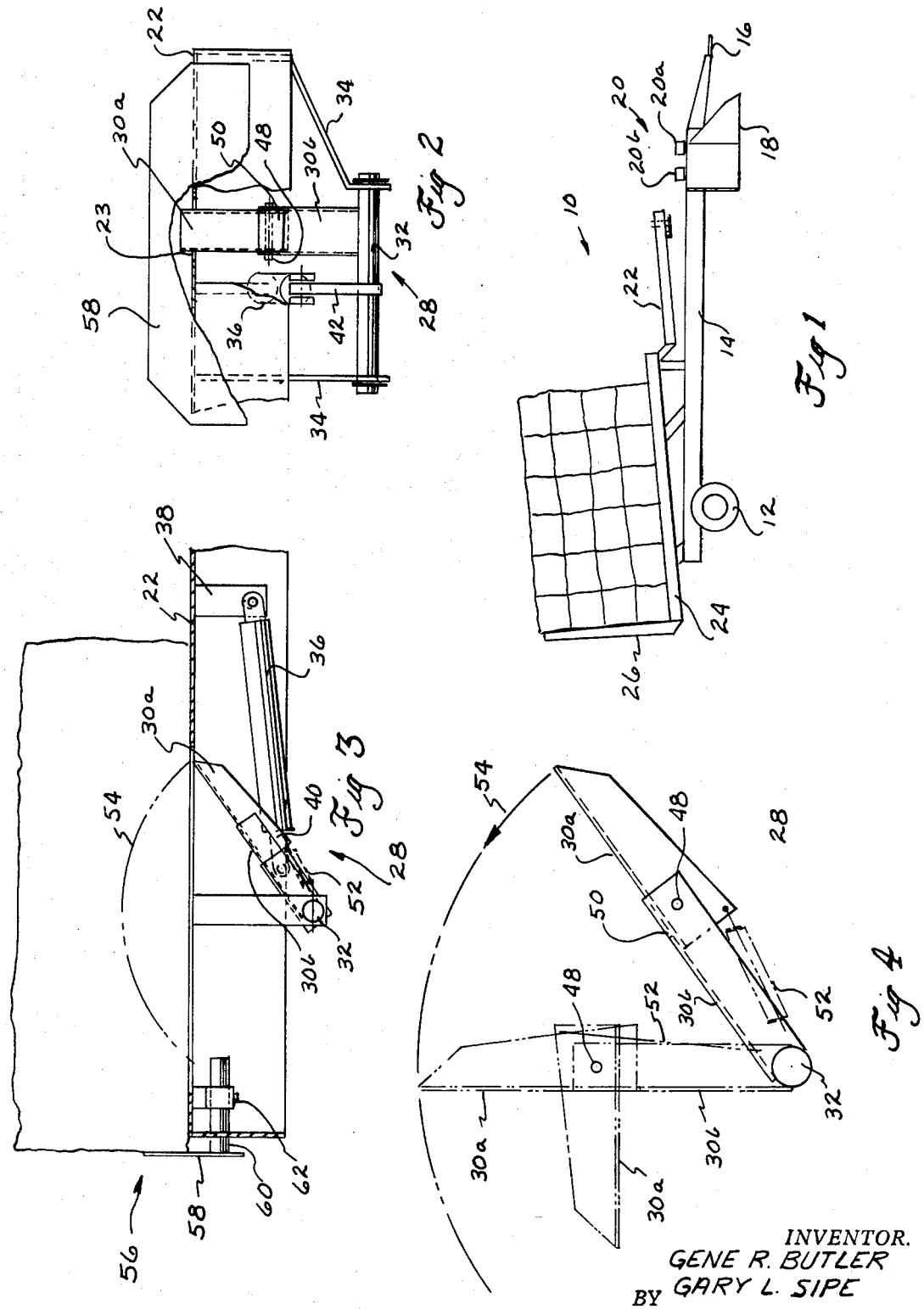

INVENTOR
GENE R. BUTLER
BY GARY L. SIPE
*Larry L. Coats*
ATTORNEY

BALE RELOCATOR MECHANISM FOR A BALE WAGON

BACKGROUND OF THE INVENTION

The present invention relates to bale wagons and more particularly to a mechanism therefore for engaging and repositioning bales thereon.

Over the past years, the three-table bale wagon, such as that disclosed in U.S. Pat. No. 2,848,127 to G. E. Grey, has become by far the most successful commercial bale wagon. From a study of the Grey patent referred to above, one will appreciate that the bale wagon shown therein includes three tandemly arranged tables, each pivotally mounted about a transverse axis relative to the longitudinal center line of the wagon. Bales of hay are picked up from the field and conveyed onto a first receiving table which pivots upwardly about its transverse axis to deposit the bales on a rearwardly disposed transfer table. The receiving table continues to receive bales and deposit the bales received on the transfer table until a tier of bales has been accumulated thereon. Once a full tier of bales has been accumulated on the transfer table, the transfer table is pivoted upwardly about its transverse axis, causing the tier of bales to be deposited on a rearwardly disposed load bed. The transfer table continues to function as a bale accumulator, and continues to deposit the tiers formed thereon in succession on said load bed until a stack of bales is formed thereon, the stack being comprised, of course, of a series of side-by-side tiers.

Once the stack has been formed on the load bed, the bale wagon can then deposit the entire stack on the ground or on some other storage surface by pivoting the load bed about a transverse axis, allowing the stack to be disposed in a general upright manner on the ground or in a storage area.

Stacking has become a very important function of a bale wagon. To a significant degree, the overall performance of a bale wagon and specifically the quality of the stack and its ability to stand over long periods of time and to be retrieved readily depends on the bales being of uniform shape and having relatively constant dimensions. In this regard, the three-table Grey type bale wagon includes a trip arm adjacent one end of the receiving table opposite the pickup. The purpose of the trip arm is to actuate the first receiving table when the outermost end of the first bale received engages the trip arm, causing the first receiving table to pivot upwardly depositing the bales thereon on the front portion of the transfer table. Because of this, all of the bales along the trip side of the bale wagon are in very good alignment. But should the bale wagon pick up some short bales of less length than the standard length, and these bales happen to be placed on the side of the bale wagon opposite the first table trip arm, it follows that the receiving table cycles without regard to the relative position of the outer end of the short bales. The net result is that the side of the stack opposite the trip arm side becomes very jagged and is not properly aligned. It will be appreciated that as long as all of the bales are of constant length this problem does not present itself. It is only when there appears bales of non-standard length, particularly short bales, on the side of the bale wagon opposite where the trip arm senses the first bale received by the receiving table during each of its cycles.

The problem of short and long bales has continued to exist with hay balers for some time, although there has been substantial work done in the area of making a bale with precise dimensions each and every time a bale is baled in the hay baler. But because of so many variables and the general biological nature of hay coupled with the fact that any mechanism devised must not be overly complex or expensive, it appears that a solution to the bale length problem is not going to be immediate.

SUMMARY OF THE INVENTION

In view of the problem that currently exists in hay balers today relative to producing bales of constant uniform length, applicants have devised a bale relocator mechanism for employment within a bale wagon for engaging and repositioning selected bales to compensate for any variance in length, so as to position the bales during the formation of a stack on a bale wagon such that each tier formed provides an adequate support for the tiers disposed thereabove, wherein when the entire stack is deposited on the ground the stack is not substantially uneven on either side and will stand up for long periods of time.

The present bale relocator mechanism of this invention is disclosed in two species. The first species is adapted for employment on the transfer table of a bale wagon, particularly on the front and generally to one side thereof. The first species comprises a finger structure disposed generally below said transfer table and adapted to be moved up through an opening therein for engagement with an overlying bale. The finger structure is disposed on the side of the bale wagon opposite the receiving table trip arm such that should the bale engaged be a short bale, the finger structure moves the bale overlying the opening in the transfer table outwardly against a fence structure. The fence structure acts as a means to limit the outward movement of the bale acted upon and assures that should the bale that is being engaged be of standard length or particularly long, then the bale is not moved outwardly past the vertical plane of the fence structure. Therefore, the stack being formed should confine itself between a vertical plane of the trip mechanism and the vertical plane of the fence structure disposed on the opposite side of the bale wagon.

The second species of the bale relocator mechanism is disposed on the receiving table as opposed to the first species, which was associated with the transfer table. In particular, the second species also includes a finger structure carried by a connecting rod and generally disposed below the receiving table. The finger structure of the second species is adapted to engage a pair of transversely aligned cams that are aligned with the finger structure such that the lateral movement of the connecting rod causes the finger structure to engage the cams and move up through the receiving table, shifting the overlying bale outwardly to one side of the bale wagon against a fence structure.

In the second species, the connecting rod is actuated through a bell crank that is engageable with a trap door as the receiving table is pivoted upwardly to deposit the bales thereon on the rearwardly disposed transfer table. Therefore, each time the receiving table receives its compliment of bales and the trip arm actuates the table for depositing the bales thereon on the transfer table, the bell crank for actuating the finger structures of the bale relocator mechanism associated with the receiving table is automatically actuated.

It is therefore the principle object of the present invention to provide a bale relocator mechanism for a bale wagon for selectively engaging and repositioning bales thereon.

A further object of the present invention resides in the provision of a bale relocator mechanism for cooperating in the formation of a tier such that the tier formed is of uniform dimensions and that when placed in a stack all of the sides of the stack are relatively even.

Another object of the present invention resides in the provision of a bale relocator mechanism for a bale wagon that builds a stack by disposing tiers of bales adjacent each other, and wherein said bale relocator mechanism acts to reposition short bales of each tier such that the width of all of the tiers making up the stack is relatively constant, thereby giving rise to a sturdy, well formed stack that will stand up in a storage area without tumbling apart and falling to the ground.

A more particular object of the present invention is to provide the transfer table of a three-table bale wagon with a finger structure disposed on the side opposite the trip arm of the first receiving table, and to provide said finger structure with power means such that said finger structure is actuated through an opening in said transfer table for engagement with an overlying bale to reposition the same after the array of bales received by the receiving table is transferred to the forward portion of the transfer table, thereby repositioning the outermost bale on the opposite side of the trip arm outwardly to form a tier of uniform width.

A further object of the bale relocator mechanism referred to in the above paragraph is to provide within the finger structure a one-way back pivot upper member, such that when the finger structure is returned to an initial position the upper member will yield in response to its engagement with the overlying bale.

Another object of the present invention resides in the provision of a bale relocator mechanism for employment in conjunction with the receiving table of a three table bale wagon, and wherein means to actuate that bale relocator mechanism in response to the upward pivoting movement of the receiving table is provided, such that the particular bales being relocated are automatically acted upon each time the receiving table is cycled.

A more particular object of the present invention resides in the provision of cam means to actuate the finger structure of the bale relocator mechanism referred to in the above paragraph, and wherein said cam means are transversely aligned with said finger structure and carried by a laterally extending connecting rod such that the lateral movement thereof results in the engagement of the cam means by the finger means, causing the finger structure to pivot upwardly through the opening in the receiving table for engagement with an overlying bale or bales.

A further object of the present invention relies in the provision of a fence structure disposed on one side of the bale wagon to limit the outward repositional movement of each bale acted on by said bale relocator mechanism.

Another object of the present invention is to provide said fence structure with an adjustable mounting structure, thereby permitting the fence structure to be disposed at various positions along side said bale wagon.

Other objects and advantages of the present invention will become apparent from a study of the following description and the accompanying drawings which are merely illustrative of the present invention.

BRIEF DESCRIPTION OF THE DRAWINGS

FIG. 1 is a side elevational view of a bale wagon having a bale relocator mechanism mounted thereon.

FIG. 2 is an end elevational view of a first species for a bale relocator mechanism with portions broken away for clarity.

FIG. 3 is a side elevational view of the species shown in FIG. 2.

FIG. 4 is a view taken through the line 4—4 of FIG. 2.

Figure 5:
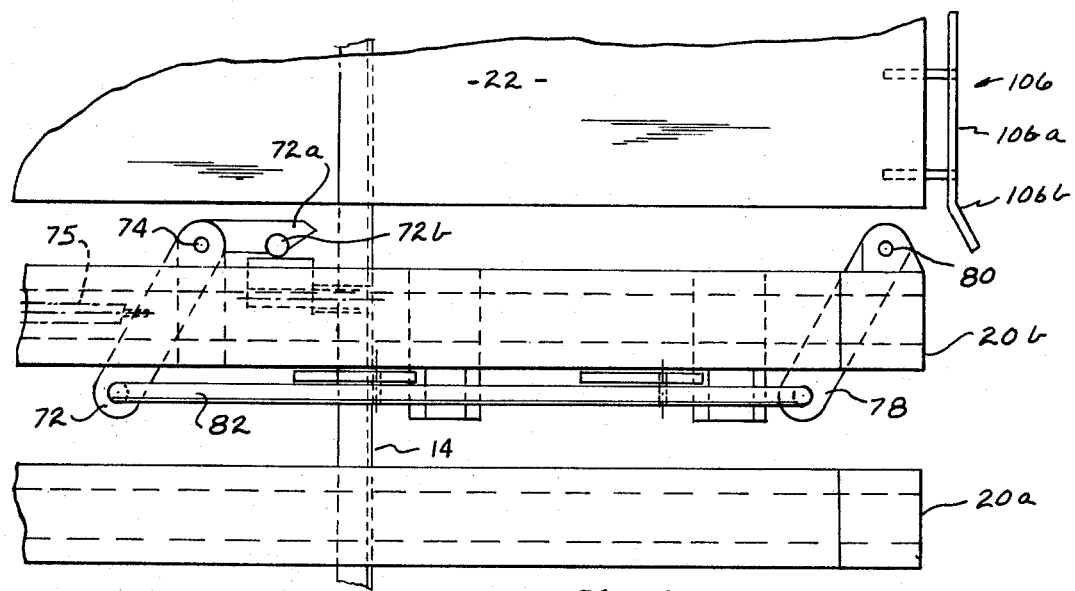
FIG. 5 is a fragmentary plan view of a bale wagon showing a second species for the bale relocator mechanism.

With reference to the drawings, particularly FIG. 1, a three table bale wagon of the Grey type shown and described in U.S. Pat. No. 2,848,127, is indicated generally by the numeral 10. Bale wagon 10 basically comprises a generally longitudinally extending chassis structure 14 supported by a pair of laterally spaced rear wheels 12. Extending forwardly from the chassis structure 14 is a clevis 16 that readily connects the bale wagon 10 to a towing vehicle, not shown, for pulling the wagon through the field.

Tandemly arranged along the chassis structure is a series of tables, these tables being referred to as a first receiving table 20, a second transfer table 22 and a third table or load bed 24. The receiving table, indicated generally by the numeral 20, includes a pair of transversely extending longitudinally spaced rail sections 20a, 20b. Although not particularly shown, the receiving table is conventionally powered by a hydraulic cylinder and is pivotally mounted about a transverse axis for movement between a normal horizontal bale receiving position, as shown in FIG. 1, and a generally vertical position where the bales thereon are deposited on the front portion of the transfer table 22.

Mounted on a front portion of the chassis 14 in an offset manner, adjacent one end of said receiving table 20, is a bale pickup 18 that functions to engage bales of hay spaced along the field and to pick up these bales of hay and convey them onto the receiving table 20.

It should be noted that the transfer table 22 is pivotally mounted about a transverse axis and functions to accumulate bales into a tier as bales are transferred from the receiving table 20 thereto. Once the predetermined number of bales have been deposited on the transfer table 22, the table is then powered upwardly about its transverse axis by a conventional hydraulic power source. This upward pivoting of the transfer table 22 results in the tier of bales formed thereon being deposited in an upright manner on the load bed 24. The tiers formed on the transfer table 22 are continued to be transferred in succession to the load bed 24 until a stack of generally upright side by side tiers completely fill the floor of the load bed 24.

It will further be noted that the load bed includes retaining means 26 fixed about the rear end thereof and extending generally upwardly therefrom for retaining the stack of bales thereon. Once the load bed has completely been loaded then the stack may be discharged onto the ground or some other storage area by simply pivoting the load bed 24 up about its transverse axis and depositing the entire stack on the ground or on the particular surface of the storage area. The depositing of the entire stack on the ground or on some other storage surface is commonly referred to in the art as "stacking." For a detailed understanding and appreciation of the basic structure of the so-called Grey three table bale wagon, one is referred to the disclosure and teachings contained in the previously discussed patent (U.S. Pat. No. 2,848,127) to G. E. Grey.

BALE RELOCATOR MECHANISM — FIRST SPECIES

Viewing FIGS. 1–4, it will be observed that a bale relocator mechanism, indicated generally by the numeral 28, is shown therein and particularly associated with the transfer table 22. It will be further noted that this first species is generally disposed beneath the transfer table about a front outer portion thereof. In particular, the bale relocator mechanism 28 basically comprises a finger structure 30, occasionally referred to as finger means, radially extending from a rockshaft 32 and fixed thereto, the rockshaft 32 being rotatably mounted in a pair of brackets 34 depending downwardly from the transfer table 22.

The finger structure 30 is actuated back and forth about the axis of rockshaft 32, which extends generally parallel to the center line of the bale wagon, by a hydraulic cylinder 36. The hydraulic cylinder 36 is anchored to a downwardly depending bracket 38, as best seen in FIG. 3, and extends generally transversely therefrom where the rod end of the cylinder 40 pivotally connects with an actuating plate 42 which is fixed to said rockshaft 32. Thus, by selectively actuating the cylinder 36, the finger means is stroked back and forth about the longitudinal axis of rockshaft 32 with the tip of the finger moving in an arcuate path denoted by the numeral 54. Because the radial length of the finger structure 30 is greater than the shortest distance between the rockshaft 32 and the floor of the transfer table 22, it is necessary that an opening 23 (FIG. 2) be formed in the transfer table 22 such that the upper portion of the finger structure 30 may pass therethrough as the hydraulic cylinder 36 is actuated. Also, at this point it may be stated that the opening 23 is just spaced rearwardly of the forward portion of the transfer table such that when bales are delivered thereto by the receiving table, the outer bale on one side of the transfer table overlies the opening 23 such that upon actuation of the cylinder 36, and consequently the finger structure 30, the bale overlying the opening 23 is engaged and moved outwardly with respect to the transfer table 22.

To limit the outward movement of a particular bale acted upon by the bale relocator mechanism 28, a fence structure, indicated generally by the numeral 56, is disposed along one side of the transfer table 22 in relatively close proximity to the finger structure 30. Viewing the fence structure in detail, it will be seen from FIG. 3 that an end plate 58 is fixed to a support member 60 that is adjustably secured to an attaching structure 62. The length that the fence structure 56 extends from the side of the transfer table can be adjusted according to the operator's wishes and the standard length of bale being picked up by the bale wagon 10.

From FIG. 4, a detail drawing is shown of the finger structure 30. It will be seen that the finger structure 30 includes upper and lower members 30a,30b respectfully, with the upper and lower members being pivotally secured about their inner ends by pivot pin 48. Also, it can be seen that the members 30a,30b are of a general channel shape and particular notice should be directed to a square cut-out 50 (FIG. 2) formed within an upper portion of the lower member 30b. This cut-out portion 50 allows the upper member 30a to pivot approximately 90° counterclockwise, as shown in FIG. 4, but is particularly formed to limit the upper member 30a from pivoting in a clockwise direction from the generally radial aligned position, shown in solid lines of FIG. 4. To return the upper member 30a to the radial position, a spring 52 is interconnected between points on the upper and lower members of the finger structure 30. Thus, to reposition a bale the hydraulic cylinder 36 is actuated, causing the piston rod 40 to be extended and causing the rockshaft 32 to rotate counterclockwise, as shown in FIG. 4. The counterclockwise rotation of the rockshaft 32 causes the finger structure 30 to also rotate counterclockwise, resulting in the upper portion of the upper member 30a passing through the opening 23 in the transfer table 22. As the upper portion of the upper member 30a passes through the opening 23, a bale overlying the opening is engaged and repositioned outwardly. If the bale acted upon is of such length that the outer end thereof engages the fence structure 56 before the cylinder rod is fully extended, then the top tip of the upper member 30a continues to pass under the stopped bale. Alternately, pressure sensitive means may be employed to limit the extension of the rod end of the cylinder when the bale engages the end member 58. As the piston rod 40 and finger structure 30 are retracted to their initial position, as shown in FIG. 3, the upper member 30a engages the bale still overlying the opening 23, and to avoid reshifting the bale back to its initial position, the upper member 30a pivots counterclockwise as shown in phantom in FIG. 4, thereby not interferring with the bale.

Not shown in this particular disclosure is the manner of controlling the cylinder 36, but it will be obvious to those skilled in the art that a separate control valve may be provided to control the actuation of this cylinder as desired. Also, it is possible to use the back pressure from the first table hydraulic power source, not shown, to actuate hydraulic cylinder 36.

BALE RELOCATOR MECHANISM — SECOND SPECIES

Figure 6:
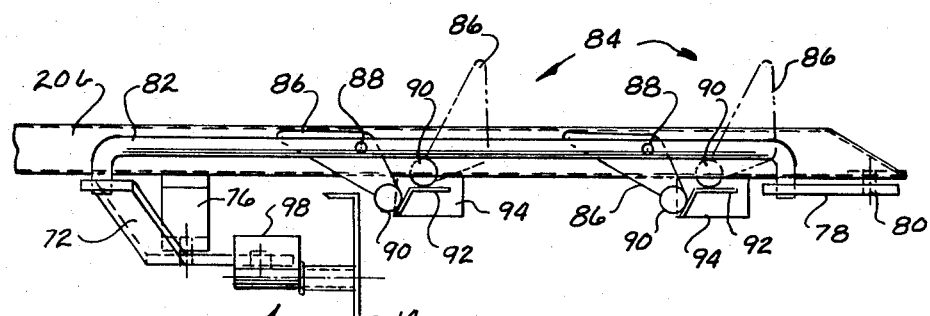
FIG. 6 is a side elevational view of the second species shown in FIG. 5.
Figure 7:
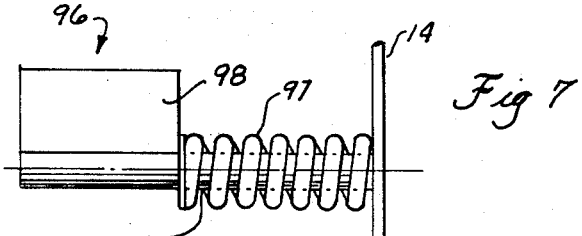
FIG. 7 is a side view of the trap door assembly for the second species shown in FIGS. 5 and 6.
Figure 8:
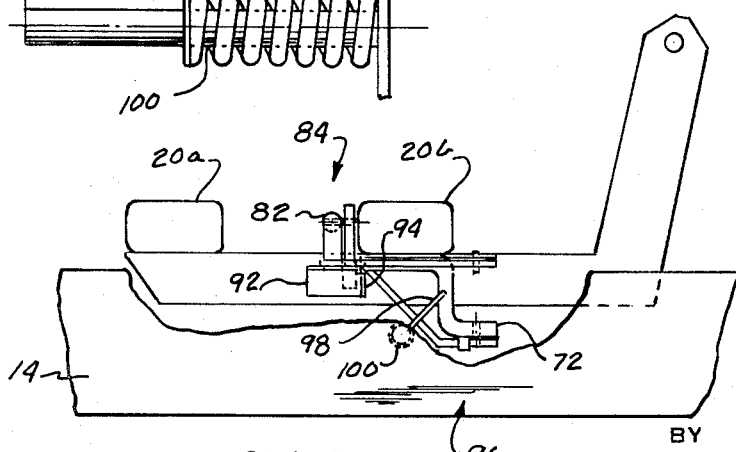
FIG. 8 is an end elevational view of the bale relocator mechanism, second species, mounted on the receiving table of a bale wagon.

With particular reference to FIGS. 5–8, the bale relocator mechanism of the present invention is shown in a second species. Basically the second species entails the placing of the bale relocator mechanism below the two transversely extending rails 20a, 20b of the receiving table 20. In particular, it will be noted that the bale relocator mechanism of the second species comprises a bell crank 72 pivotally mounted to a mounting member 76 depending from the rear rail 20b. The bell crank 72 includes an actuator end 72a (FIG. 5) which also includes a roller 72b rotatively mounted thereon. The bell crank 72 pivots about a generally vertical axis 74 extending through the mounting member 76. Transversely spaced from the bell crank 72 is a stabilizer arm 78 which is pivotally mounted about a generally vertical axis 80 which extends generally parallel with the axis of rotation 74 of the bell crank 72.

The bell crank 72 and the stabilizer arm 78 include openings therein for receiving opposite curled ends of a connecting rod 82. The connecting rod 82 includes a plurality of laterally spaced finger structures, indicated generally by the numeral 84. With particular reference to this finger structure, it will be seen from FIG. 6 that they are of generally triangular shape and are pivotally mounted to the connecting rod about a pivot axis 88. Rotatively mounted about one point of each triangular shaped plate 86 is a roller 90. The rollers 90 are aligned for engagement with a particular cam surface 92 which is formed on cam mounts 94 fixed to the underside of the rear rail 20b and extending forwardly therefrom. Therefore, as shown in phantom in FIG. 6, as the connecting rod 82 is shifted to the right, the rollers 90 engage the cam surfaces 92 causing the triangular plate 86 to pivot upwardly between the two rails 20a, 20b of the receiving table for engagement with an overlying bale, similar in principle to the manner of the first species discussed above. By shifting the connecting rod 82 to the left, as viewed in FIG. 6, the center of gravity of the triangular shaped plates causes them to pivot back downwardly below the upper surface of the receiving table 20.

As was provided with the first species, a fence structure indicated generally by the numeral 106 is provided on the transfer table to confine the outer ends of the bales of the tier being formed within prescribed limits. The fence structure 106 is also adjustable laterally to conform with the operator's wishes and the standard length of the bales being picked up by the bale wagon. The fence structure 106 of the second species does, however, differ slightly from the fence structure 56 of the first species. In this regard, it will be noted that the fence structure 106 of the second species basically comprises a rail structure 106a that extends along one side of the transfer table includes a front portion 106a angled outwardly. This angled portion 106b of the fence structure of the second species assures that bales longer than the standard length will be guided inwardly to fall within the bounds defined by the rail structure 106a. Thus, it is seen that as the receiving table 20 is pivoted upwardly to deposit bales thereon on the front portion of the transfer table 22, that the angled portion 106b of the fence structure 106 will cause the longer bales to move appropriately inwardly.

To actuate the bale relocator mechanism of the second species, a trap door, indicated generally by the numeral 96, is fixed to the chassis structure and extends therefrom for engagement with the roller 72b of the bell crank 72. Since the bell crank is carried by the receiving table 20, the roller will engage the trap door as the receiving table is pivoted upwardly. The engagement of roller 72b with the trap door causes the bell crank to pivot about its pivot axis 74. The pivoting of the bell crank 72, of course, results in the connecting rod 82 being shifted to the right, as viewed in FIG. 6. The shifting to the right of the connecting rod 82 causes the rollers 90 on the finger structures to engage the cams 92 and to reposition the particular bale overlying the finger structure on the receiving table 20. Once the receiving table 20 has moved up through an initial portion of its cycle, the roller 72b of the bell crank 72 rolls past the trap door 96. A spring 75 is interconnected between said bell crank 72 and a point on the rear rail 20b to bring the bell crank back to its initial position as shown in the FIG. 5. As the receiving table 20 pivots back downwardly towards its general horizontal position the trap door 96 is spring biased by spring 97 wound around shaft 100 to allow the bell crank to move therepast.

Therefore, it is seen that the bale relocator mechanism of the second species is actuated by the cycling of the receiving table and therefore is done automatically without the requirement that the operator so actuate.

The terms, "upper," "lower," "forward," "rearward," etc., have been used herein merely for the convenience of the foregoing specification and in the appended claims to describe the bale relocator mechanism for a bale wagon and its parts as oriented in the drawings. It is to be understood, however, that these terms are in no way limiting to the invention since the bale relocator mechanism for a bale wagon may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described our invention, what we claim is:

1. In a bale wagon having a generally longitudinally extending wheel mounted chassis, a load bed pivotally mounted about a transverse axis to said chassis and having power means associated therewith for pivoting said load bed from a generally normal horizontal position to a vertical position, tier forming means mounted adjacent said load bed and adapted to receive bales thereon and to form the bales into tiers, means for depositing the tiers formed on said tier forming means on said load bed to form a stack thereon, a bale relocating mechanism associated with said tier forming means for repositioning selected bales on said tier forming means, said bale relocating mechanism comprising:

a. finger means, b. means for mounting said finger means for lateral movement relative to said tier forming means for selectively engaging and repositioning a bale situated on said tier forming means, c. a fence stationed along one side of said tier forming means and laterally spaced from said finger means for limiting the repositional movement of the bale being acted upon by said finger means, and d. means for actuating said finger means for engagement with a bale situated on said tier forming means.

2. A bale wagon, as recited in claim 1, wherein said tier forming means comprises a transfer table pivotally mounted about a transverse axis adjacent said load bed, and a receiving table pivotally mounted about a transverse axis forwardly of said transfer table, said receiving table, transfer table and load rack arranged in tandem with said receiving table adapted to receive bales and deposit the received bales on said transfer table to form a tier of bales thereon, and said transfer table adapted to pivot upwardly to deposit each tier formed thereon on said load rack to form a stack, and wherein said finger means is mounted beneath said transfer table and is operatively disposed thereunder to move through an opening in said transfer table for engaging and repositioning a bale overlying said opening.

3. A bale wagon, as recited in claim 1, wherein said tier forming means includes a transfer table mounted about a transverse axis forwardly of said load bed and a receiving table pivotally mounted about a transverse axis forwardly of said transfer table, said receiving table, transfer table and load bed being tandemly arranged such that all three cooperate to receive bales and form a stack on said load bed, said cooperation including the receiving of bales by said receiving table and the depositing of said received bales by the receiving table on said transfer table wherein a tier of bales is accumulated thereon and deposited on said load bed to form a stack of side by side generally upstanding tiers on said load bed, and wherein said bale repositioning mechanism is disposed on said receiving table and wherein said actuating means is operatively connected to said finger means for actuating said finger means in response to the upward pivotal movement of said receiving table, whereby at least one bale thereon is engaged and repositioned against said fence station along one side of tier forming means.

4. In a bale wagon having a wheel mounted chassis structure, a load bed pivotally mounted to said chassis structure, tier forming means disposed adjacent said load bed and adapted to receive and accumulate bales thereon to form a tier of bales, means for transferring the formed tiers on said tier forming means to said load bed, a bale relocating mechanism for engaging and repositioning selected bales on said tier forming means, comprising:

a. finger means, b. means for mounting said finger means for lateral back and forth movement relative to said tier forming means for selectively engaging and repositioning at least one selected bale on said tier forming means, and c. means for actuating said finger means for selective engagement with said bale to reposition the same.

5. A bale wagon, as recited in claim 4, wherein a fence structure is situated along one side of said tier forming means and laterally spaced from said finger means, said fence structure being provided thereon to limit the lateral extension of the bales repositioned by said finger means.

6. A bale wagon, as recited in claim 4, wherein said tier forming means includes a table support, and wherein said means for mounting said finger means includes means for pivotally mounting said finger means about a longitudinal axis relative to said bale wagon, and wherein said axis is spaced below said table support and moveable through an opening formed therein for engagement with a bale overlying said opening upon the actuation of said finger means.

7. A bale wagon, as recited in claim 4, wherein said means for actuating said finger means includes a hydraulically powered cylinder.

8. A bale wagon, as recited in claim 4, wherein said finger means includes first and second members pivotally secured together about inner portions of each member, and wherein one of said members is spring biased to a normal position of general radial alignment with said other member but is yieldable in one direction for returning to an initial position without returning the repositioned bale to its initial position.

9. A bale wagon, as recited in claim 4, wherein said tier forming means includes a support table and wherein said finger means are normally spaced below an opening therein; said means for mounting said finger means including a transversely extending support structure having said finger means pivotally mounted thereon; and wherein said actuating means includes cam means aligned with said finger means, and means for shifting said support member laterally, causing said finger means to engage said cam means and pivot said finger means upwardly through said opening, engaging and repositioning an overlying bale.

10. A bale wagon, as recited in claim 4, wherein said means for actuating said finger means includes a pivotally mounted bell crank having one end pivotally connected to said transversely extending support member and the other end disposed adjacent a trip that is fixed to said chassis structure such that upon the pivotal movement of said support table, said trip pivots said bell crank causing said support member to be shifted laterally, causing the finger means to engage and reposition an overlying bale.

11. A bale wagon, as recited in claim 10, wherein biasing means is interconnected between said chassis structure and said bale relocator mechanism for returning said finger means to an initial position after each bale is relocated.

12. A bale wagon, as recited in claim 11, wherein said biasing means includes a spring fixed at one extremity to said chassis structure and connected at the other extremity to said pivotally mounted bell crank.

13. A bale relocator mechanism for a bale wagon comprising: a generally flat support table having an opening therein; means for transferring bales to said support table such that at least one bale transformed thereto lies over said opening; a finger means pivotally mounted beneath said support table about a longitudinal axis extending generally parallel to the longitudinal center line of said bale wagon; a fence structure situated about one side of said support table and laterally spaced from said finger means; and means for pivoting said finger means about said longitudinal axis, causing a portion of said finger means to move through the opening in said support table, engaging and repositioning the overlying bale against said fence structure.

14. A bale wagon as recited in claim 13, wherein said support table forms a transfer medium between a receiving table and a load bed, both pivotally mounted about separate transverse axes, whereby said support table functions to accumulate bales thereon and transfer the bales in the form of tiers to said load bed.

15. A bale wagon, as recited in claim 13, wherein said fence structure includes a generally vertically disposed stop member having a support member fixed thereto and adjustably secured to said support table such that the relative position of said fence structure may be adjusted relative to said support table and said finger means.

16. A bale wagon, as recited in claim 13, wherein said finger means includes upper and lower members pivotally secured together, said upper member being maintained in general radial alignment with said lower member when engaging and repositioning a bale, said upper member being further yieldable when returning to an initial position such that the engagement of the upper member with an overlying bale results in said upper member pivoting and thereby being ineffective to move the already repositioned bale overlying said opening, said upper member further being spring biased to assume the radial aligned position for engaging and repositioning a bale as it moves from said initial position.

17. A bale wagon as recited in claim 13, wherein said means for actuating said finger means comprises a hydraulic power cylinder anchored to said support table and having its rod end operatively connected to said finger means for pivoting said finger means back and forth about said longitudinal axis.

18. A bale relocator mechanism for a bale wagon comprising: a support table having an opening therein and pivotally mounted for movement between a generally horizontally receiving position and a vertical depositing position; means for pivoting said support table from said horizontal position to said vertical position; an elongated rod structure moveably mounted beneath said opening in said support table; a plurality of finger means laterally spaced and pivotally mounted on said elongated rod structure; cam means fixed relative to said support table and aligned with said finger means for engagement therewith, the cams being spaced such that the engagement of said cams with said finger means causes said finger means to pivot up through said support table for engagement with a bale overlying said opening therein; and means for actuating said elongated rod structure for back and forth lateral movement in response to the upward pivoting of said support table from said horizontal position to said vertical position.

19. A bale wagon, as recited in claim 18, wherein said means for actuating said elongated rod structure in response to the pivoting of said support table includes a bell crank pivotally mounted and engageable with a trip arm extending from a chassis structure supporting the bale wagon and generally underlying said support table.

20. A bale relocator mechanism for a bale wagon comprising: a generally longitudinally extending wheel supported chassis, a load bed pivotally mounted about a transverse axis to the rear portion of said chassis and tiltable from generally horizontal load receiving position to a generally vertical stacking position; a transfer table pivotally mounted about a transverse axis forwardly of said load bed and adapted to receive bales thereon to accumulate the bales received into a tier and to pivot from a generally horizontal position to a vertical position where said tiers are deposited on said load bed; a receiving table pivotally mounted about a transverse axis forwardly of said transfer table and adapted to receive bales and deposit said bales in succession to the forward portion of said transfer table; a bale pickup device offset to one side of said chassis structure adjacent one end of said receiving table for picking up bales from the field and delivering the picked up bales to said receiving means; the improvement comprising a bale relocator mechanism for association with said transfer table comprising a generally elongated finger pivotally mounted about a longitudinal axis below said transfer table and moveable in an arcuate path from an initial position, through an opening in said transfer table where a bale overlying said opening is engaged by said finger means and shifted laterally towards an outer side of said transfer table; said finger being further operatively to return to said initial position and being pivotally mounted, said finger member being comprised to sub-members pivotally secured together such that the upper sub-member will yield when contacting the already repositioned bale as the finger returns to said initial position; a fence structure disposed about the outer side of said support table and spaced laterally from said finger for limiting the outer protrusion of the bale being repositioned; an hydraulic cylinder means anchored beneath said support table and operatively connected to said finger for actuating said finger to reposition selected bales.

* * * * *